Sept. 16, 1941.    R. A. LILLICH    2,256,119
BACK PRESSURE VALVE
Filed Oct. 21, 1938

Inventor
RALPH A. LILLICH
Jesse R. Stone
Lester B Clark
Attorneys

Patented Sept. 16, 1941

2,256,119

UNITED STATES PATENT OFFICE 2,256,119

BACK PRESSURE VALVE

Ralph A. Lillich, Houston, Tex.

Application October 21, 1938, Serial No. 236,173

12 Claims. (Cl. 255—28)

The invention relates to drill stems and more particularly to a valve mechanism that may be located at any desired point in a drill stem to automatically close the stem in the event of a reverse flow through the drill stem tending to initiate a drill stem blowout.

It is the primary object of the invention to provide a valve construction which may be incorporated in a drill stem and which will be positive in operation to close the drill stem and prevent a blowout thru the stem.

It is also an object to provide a device of the class described which does not restrict the bore thru the drill stem.

It is also an object to provide a construction having complementary valve elements to form a composite cup shaped valve when in closed position.

Another object is to provide a valve in which complementary valve elements are normally retained in open position.

Still another object is to provide a device of the class described in which the complementary valve elements are positioned within an enlargement in the bore of the drill stem together with an orificed piston to which the valve elements are operatively connected so that an upward movement against the piston will be effective to actuate the valve elements and close the passage thru the stem.

Still another object is to provide a device of the class described in which the bore below the actuating piston diverges toward the piston to increase the effectiveness of upwardly moving fluid within the drill stem in closing the valve.

Other and further objects will be apparent from the following description taken in connection with the drawing, in which.

Figure 1:
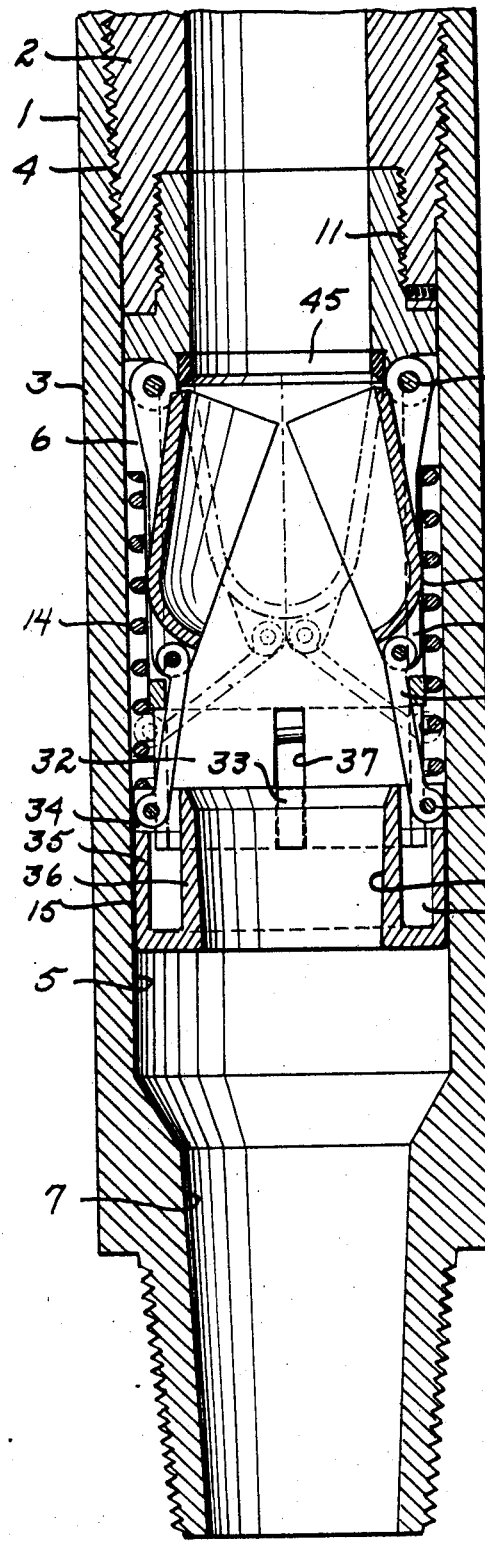
Fig. 1 is a vertical section thru a sub or joint embodying the invention.
Figure 2:
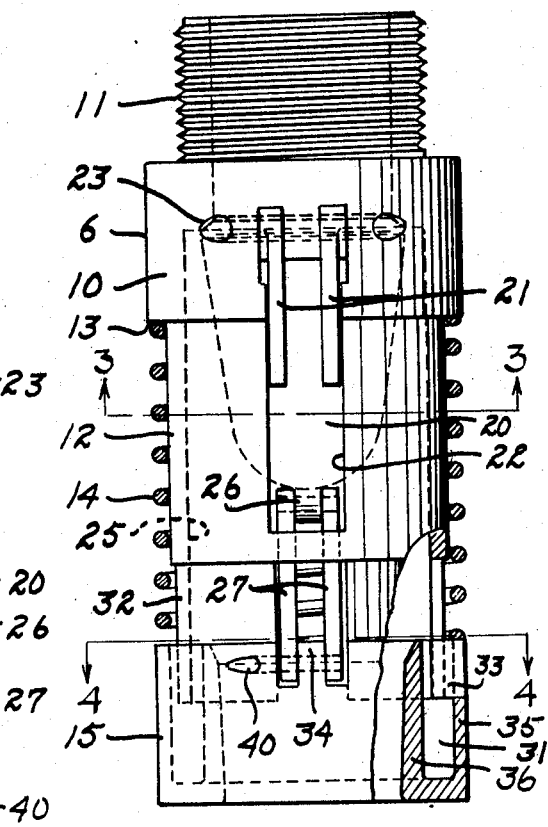
Fig. 2 is an elevational view of a valve unit comprising a part of the invention, the parts being shown in section to more clearly illustrate the construction.

A device embodying the invention is illustrated in Fig. 1 as a sub I comprising upper and lower tubular sections 2 and 3 which are threadably interconnected at 4. The bore 5 in the section 3 is enlarged to receive a valve assembly generally indicated as 6. The bore 5 is tapered at 7 at its lower end to serve a purpose which will be made apparent.

It is understood that the sub I is provided at its opposite ends with desired pin and box members so that the sub may be connected in a drill stem in the manner well known in the art.

An important feature of the invention is the valve assembly 6 which comprises a valve cage 10 which is provided with threads 11 at its upper end so that it may be attached by means of complementary threads to the section 2 of the sub. It is to be noted that the bore at the upper end of the valve cage 10 is of the same dimension as the bore in the section 2 which is in turn of the same diameter as the bore in the drill stem with which the construction is used.

The valve cage 10 has a portion 12 of reduced cross section thereby forming a downwardly facing shoulder 13 to serve as an abutment for a spring 14 which surrounds the valve cage and which also engages a piston 15 at the lower end of the valve cage.

Figure 3:
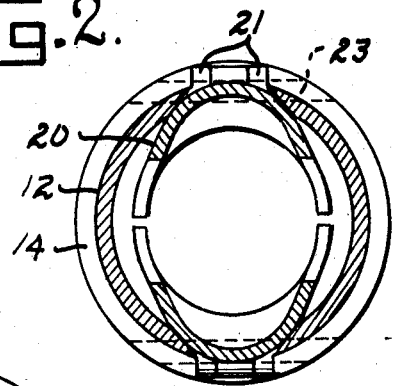
Fig. 3 is a sectional view taken on line 3—3 in Fig. 2.
Figure 4:
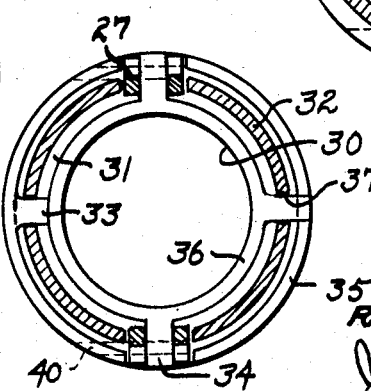
Fig. 4 is a sectional view taken on line 4—4 in Fig. 2.

The valve members for closing the passage thru the sub I are cup shaped members 20 which are provided with spaced outstanding projections 21 which extend thru openings 22 in the valve cage 6. These projections are provided with openings to receive a pivot pin 23 whereby the valve members 20 are hingedly supported within the valve cage 6. The valve members 20 are of such size and configuration that when contracted to contact the inner walls 25 of the valve cage 6 the bore thru the sub is not restricted thereby as is most clearly indicated by reference to Fig. 3.

Each of the valve members 20 is provided with a downwardly extending ear 26 at its lower end and connecting links 27 which pivotally connect to such ears. The lower ends of the links 27 are in turn pivotally connected to the piston 15 to which further attention will now be directed.

The piston 15 is an annular channel construction having a central opening or orifice 30 of the same size as the bore in the drill stem to which the device is attached. This piston is channeled at 31 so that upon upward movement of the piston relative to the valve cage 6 the skirt 32 of the valve cage will enter this channel. This construction also includes a plurality of lugs 33 and 34 integral with the piston and connected to the limbs 35 and 36 of the piston.

The lugs 33 are of such dimension as to fit closely within a slot 37 in the skirt 32. In this manner it is impossible for angular displacement of the piston relative to the valve cage 6 to take place.

Lugs 34 are provided with openings to receive pivot pins 40 whereby the links 27 are pivotally connected to the piston 15.

In accordance with the construction just described it is believed apparent that the pressure exerted by the spring 14 upon the piston 15 will urge the piston downwardly and will therefore maintain the valve elements 20 in the position shown in Fig. 1. If, however, an upward force is exerted on the piston 5 there will be an upward movement of the piston and the valve elements 20 will be forced inwardly to the position shown in dotted outline in Fig. 1. When the valve elements move to this position the upper ends thereof will also engage an annular seat member 45 in the valve cage and hence effect complete closure of the passage thru the sub 1. The construction just described will be normally used by inserting in a drill stem which is rotated to operate drill bit at the lower end thereof. Drilling fluid will pass freely downwardly thru the drill stem since the construction is such that there will be no obstruction to the downward passage of the drilling fluid. If, however, there is a movement of the drilling fluid upwardly within the drill stem such fluid will diverge in the bore 7 and will produce pressure upon the lower face of the piston 15. As soon as this pressure exceeds that exerted by the compression spring 14 the piston will move upwardly and the valve elements 20 will be moved toward their final position as indicated in dotted outline in Fig. 1.

After initial movement of the valve elements 20 the movement thereof will be accelerated by virtue of the fact that the moving liquid will also engage an outer surface of the valve elements. It is believed apparent that the construction will therefore be actuated upon upward movement of liquid at or in excess of predetermined velocity which will be determined by the strength of the spring 14.

It is well known that in rotary drilling operations the drill stem is subjected to severe vibrations. In order to overcome the effects of these vibrations and to avoid misalinement of parts of the present construction the lugs 33 are provided on the piston to cooperate with the slots 37 in the valve cage 10.

While the invention as described comprehends the use of a valve assembly 6 whereby replacement is possible after parts have become worn, it is intended that the invention shall comprehend the use of a valve construction wherein the respective elements are mounted directly to the sub 1. Likewise it may be noted that by the use of the taper 7 the sub 1 may be made relatively short without reduction in the efficiency of operation. It is to be understood, however, that such taper may be dispensed with if it is desired to make the sub 1 of sufficient length that the change in head of the liquid as it moves upwardly toward the piston 15 is such that sufficient pressure is exerted against the piston to produce desired operation without excessive velocity of the liquid.

Broadly the invention comprehends the provision of a drill stem valve in which the passage thru the drill stem is unobstructed and which includes the use of an orificed piston whereby the valve will be closed upon a predetermined upward velocity of drilling fluid within the valve stem.

What is claimed new is:

1. In combination with a drill stem a tubular body having an enlarged bore therein, complementary valve members hinged in the body to be moved to close the passageway and to be moved back into said bore so that the passage through the body will be unobstructed, an orificed piston in the bore below said members, links connecting the piston to said valve members, and means resiliently urging said piston downwardly to normally hold the valve members in retracted position.

2. In combination with a drill stem a tubular body having an enlarged bore therein, complementary valve members hinged in the body to be moved to close the passageway and to be moved back into said bore so that the passage through the body will be unobstructed, an orificed piston in the bore below said members, links connecting the piston to said valve members, means resiliently urging said piston downwardly to normally hold the valve members in retracted position, and means for guiding the piston longitudinally of the tubular body.

3. In combination with a drill stem, a tubular body having an enlarged bore therein, complementary valve members mounted within said bore, a piston in said bore having an axial orifice therein, a connection between the piston and said valve members, and means normally urging the piston to hold the valve open.

4. In combination with a drill stem, a tubular body having an enlarged bore therein, swingable valve members mounted in said bore, and an orificed piston below the valve members and connected thereto, the bore within the body converging downwardly from the piston so that the change in velocity head of an upward flow of fluid will move the piston upwardly and close the valve.

5. In a device of the class described a pair of tubular members threaded for interconnection in a drill stem, a valve seat at the end of one of said members, a valve comprising complementary valve members mounted in the other of the tubular members and adapted to move into cooperative relation and to engage the valve seat to close the passage through the drill stem, and an orificed piston below the valve members and connected thereto.

6. In a device of the class described a pair of tubular members threaded for interconnection in a drill stem, a valve seat at the end of one of said members, a valve comprising complementary valve members mounted in the other of the tubular members and adapted to move into cooperative relation and to engage the valve seat to close the passage through the drill stem, an orificed piston below the valve members and connected thereto, and means for guiding the piston longitudinally of the tubular members when an upward flow of the fluid moves the piston upwardly to close the passage through the members.

7. In a device of the class described a tubular body having an enlarged bore therein, swingable valve members in said bore, a piston in said bore and connected to said members, said piston having an axial opening so that the bore through the drill string will be unobstructed when the valve members are swung to open position, and means normally urging the piston away from the valve members to maintain the passage open through the body.

8. In a device of the class described a tubular body having an enlarged bore therein, complementary cup shaped valve segments pivotally mounted at the upper end of the enlarged bore and adapted to move inwardly and close the passage through the body, means normally holding said valve segments in retracted position so that the passage through the body will be unobstructed, and means for moving the valve segments to closed position when fluid moves upwardly within the body at a predetermined velocity.

9. A drill stem sub comprising upper and lower tubular sections, the lower of said sections having an enlarged bore, a valve assembly within the enlarged bore, said valve assembly including hinged valve members and an orificed piston connected thereto to close the passage through the sub upon upward movement of fluid through the sub, the inner walls of the lower tubular section diverging toward the piston so that a maximum change in velocity head will take place in fluid moving to and through the piston.

10. A valve assembly for drill stems comprising a tubular valve cage, pivoted cup-shaped valve members within said cage, an orificed piston at the lower end of the cage, connections between the piston and the valve members and means for guiding the piston longitudinally of the valve cage during movement of the piston to open and close the valve.

11. A valve assembly for drill stems comprising a tubular valve cage, pivoted cup-shaped valve members within said cage, an orificed piston at the lower end of the cage and connected to said valve members, guiding fins on said piston, and slots in the valve cage adapted to slidably receive said fins.

12. In combination with a drill stem, a tubular body having an enlarged bore therein, a valve assembly amounted within said bore, said valve assembly being so constructed and arranged that the bore through the drill stem is unobstructed thereby when the valve is open, said valve assembly including an orificed piston slidable within the bore to close the valve when fluid moves upwardly at a predetermined velocity within the valve stem.

RALPH A. LILLICH.